UNITED STATES PATENT OFFICE.

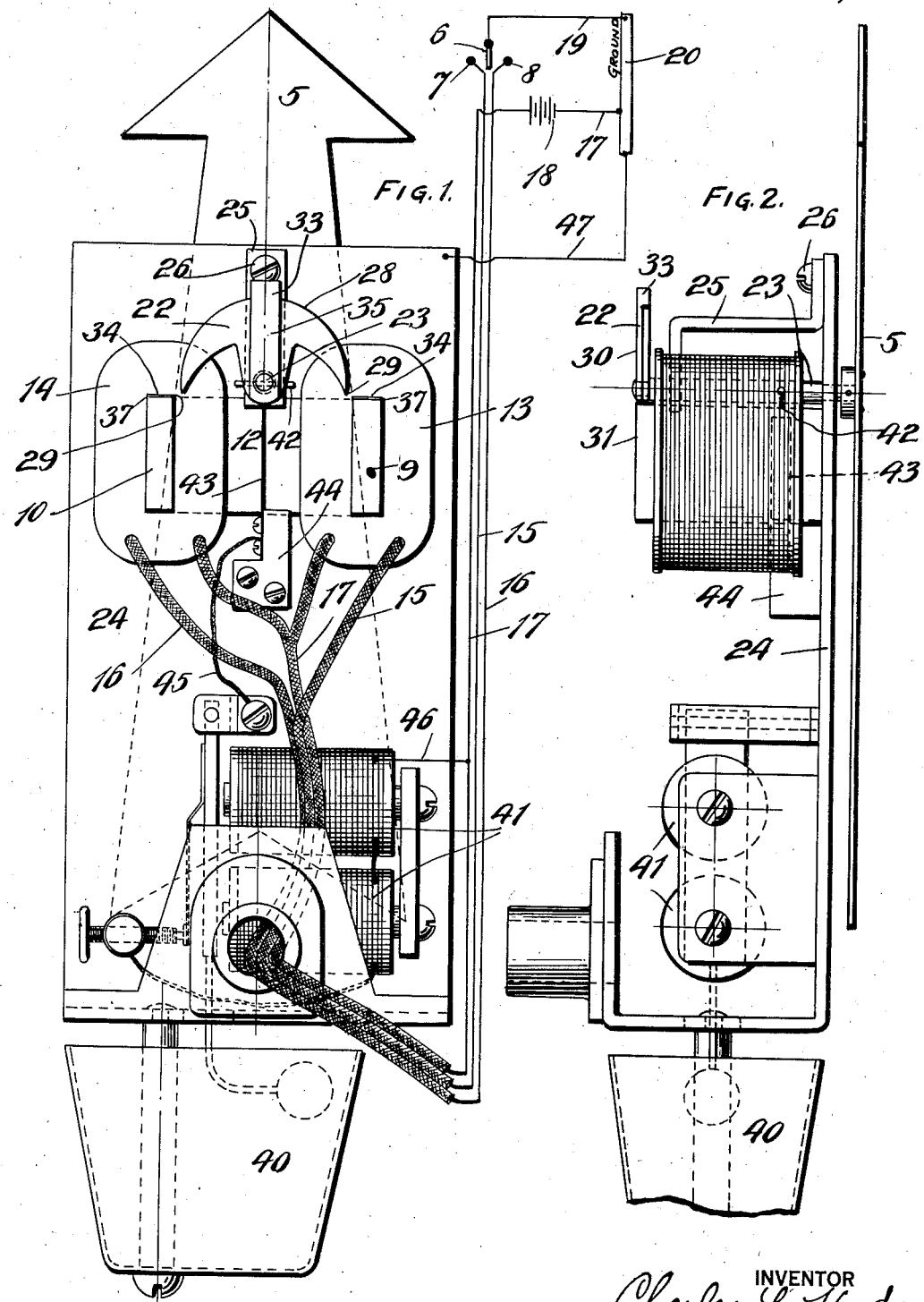

CHARLES L. HYDE, OF PLAINFIELD, NEW JERSEY.

AUTOMOBILE-SIGNAL.

1,356,150. Specification of Letters Patent. Patented Oct. 19, 1920.

Application filed March 28, 1919. Serial No. 285,853.

*To all whom it may concern:*

Be it known that I, CHARLES L. HYDE, a citizen of the United States, residing at Plainfield, in the county of Union and State of New Jersey, have invented certain new and useful Improvements in Automobile-Signals, of which the following is a specification.

The present invention relates to an improvement in automobile signals.

The object of the invention is to reorganize and improve upon the construction and arrangement of the parts of an automobile signal for the purpose of producing a more sensitive, quickly responsive, durable and efficient automobile signal than has heretofore been produced. This object is accomplished in the improved automobile signal described and claimed in the following specification:—

The preferred form in which it is at present contemplated embodying the invention is illustrated in the accompanying drawings, in which Figure 1 is a diagrammatic front elevation of the improved automobile signal with its associated parts, and Fig. 2 is a side elevation of the parts shown in Fig. 1.

The improved automobile signal of the present invention as illustrated in the accompanying drawings comprises a signal proper or pointer 5 and means for actuating it. The pointer 5 may be located at the rear of the machine or at the front of the radiator, or it may be located at both places. The function of the pointer is to give notice or warning to others, by its position, of the movement or contemplated movement of the operator of the vehicle on which it is placed. The pointer is actuated by the closing of one or the other of two circuits. When the pointer is to be deflected to point to the right hand viewing Fig. 1, the switch 6 is moved into contact with the terminal 7 by the operator; and when the pointer 5 is to be deflected to the left to indicate a movement in that direction, the switch 6 is moved into contact with the terminal 8. The closing of these circuits energizes the arms 9 and 10 of a horseshoe magnet, generally indicated at 12. Each arm of the magnet is surrounded by a coil of wire, so that it may be energized independently of the other arm. The coil 13 which surrounds the arm 9 is in the circuit which is closed by the contact of the switch 6 with the terminal 7; and the coil 14 which surrounds the arm 10 is in the circuit which is closed by the contact of the switch 6 with the terminal 8. The coil 13 is connected with the terminal 7 by the wire 15 and the coil 14 is connected with the terminal 8 by the wire 16. Both coils have the wire 17 in common. In the wire 17 is placed the battery 18 and the circuits are completed by having the wire 17 and the wire 19 connected with the switch 6 terminate in the grounding device 20, designated as the "ground" on the drawings. It is thus seen that when the pointer is to be deflected to the right, the circuit is made through the wires 15, 17, 19, and the ground; and that when the pointer is to be deflected to the left hand, the circuit is made through the wires 16, 17, 19, and the ground.

The pointer 5 is actuated on the energization of either arm of the magnet 12 by the action of the magnet upon an armature 22. This armature forms an important feature of the present invention. By reason of its peculiar and novel construction, the pointer is brought into its movement indicating position quickly and without rebound and is held in that position without oscillation until contact between the switch 6 and the terminals 7 and 8 is broken. The armature 22 is mounted on the inner end of a shaft 23 on the outer end of which the pointer 5 is mounted, as clearly shown in Fig. 2. The shaft 23 is journaled at its front or outer end in a plate 24, which is adapted to be secured at a convenient spot to the automobile; and is journaled at its inner or rear end in a bracket 25 secured by the screw 26 to the upper end of the plate 24. By reason of this construction, there is no liability of the shaft 23 becoming cramped in its bearings and so having a retarding action upon the movements of the pointer.

The armature is of segmental or crescent shape in plan, as shown in Fig. 1, and the radius of the crescent, that is to say, the distance from the center of the shaft 23 to the curved surface 28 of the armature is slightly less than the distance between the center of the shaft 23 and the upper inner edges 29 of the magnet arms 9 and 10, so that when the arms are energized the armature will swing freely between them. It will be seen by reference to Fig. 2 that the outer face 30 of the armature 22 lies on a plane with the outer edges 31 of the magnet arms 9 and 10. The operative position of the pointer 5, that is to say, its horizontal position with its indicating end pointing either to the right or to the left, is determined by the engagement of the upper end 33 of the armature 22 with the top surfaces 34 of the magnet arms 9 and 10. The construction and arrangement of the parts are such that when the stop part 33 of the armature 22 is in contact with either the upper surface of the arm 9 or the arm 10, the pointer 5 occupies a horizontal position. The upper end or stop portion 33 of the armature 22 is a prolongation of the middle part 35 of the armature, and this middle part of the armature is substantially twice the thickness of the end or curved portions of the armature, as is clearly indicated in the drawings. By reason of this peculiar construction, the pointer has no tendency to rebound or oscillate after it has been brought into operative, movement indicating position by an energization of the magnet. This will be clear when it is considered that only one of the arms of the magnet is energized at one time and that the heavy middle portion 35 of the armature is in direct contact with the energized arm of the magnet, whereas only the relatively thin and tapered point of the curved portion of one of the two ends of the armature is under the influence of such few magnetic lines of force as surround the unenergized arm of the magnet. It is impossible, of course, with a horseshoe magnet to prevent a slight energization of the other arm when the one arm is positively energized. The construction of armature shown in the drawings and described above nullifies the action of the unenergized arm on the armature.

In order that such magnetic lines of force as remain surrounding the energized arm of the magnet upon the breaking of the contact between the switch 6 and its respective terminal will have no retarding effect upon the armature as the pointer 5 returns to its vertical or inoperative position under the influence of gravity (the pointer being mounted in unstable equilibrium), each arm of the magnet is provided with a thin strip 37 composed of brass, copper or some other non-magnetizable material. It has been found by experiment that if the strips 37 are removed from the arms 9 and 10 of the magnet, the pointer 5 does not swing into its vertical or inoperative position with the alacrity it does when the magnet arms are provided with the magnetic field breaking strips 37.

The segmental or crescent-shaped armature, as shown in the drawings, is mounted on a pin or shaft located above the magnet, and is articulated with the pointer in such manner that when the pointer is in vertical or inoperative position, the curved part of the armature is uppermost and the two ends are pointed downward. This arrangement has been found more advantageous than the arrangement in which the armature occupies the reverse position. It conduces to the more ready responsiveness of the armature to the action of the magnet.

It is desirable, when the pointer 5 has been operated to indicate the contemplated movement of the automobile or other vehicle, to throw an annunciator or audible signal apparatus into operation automatically, so that the operator of the vehicle will not forget that his movement signal is in operative position. For this purpose, a bell arrangement, generally indicated at 40, is provided and is so connected with the pointer operating parts that it is automatically thrown into operation. The bell 40 may conveniently be located near the operator, or it may be located near the signal in order to attract the attention of others to the fact that the signal is in operative position indicating the contemplated movement of the vehicle. The bell, or audible signal, as it may be termed, is operated by a coil magnet of ordinary construction, indicated generally at 41. This magnet 41 is energized when the pointer 5 is in horizontal position, pointing either to the right or to the left hand. When the pointer 5 is in its horizontal, movement indicating position, a pin 42 passed through the shaft 23 contacts with a resilient terminal 43 fastened to a block 44 which is secured to the plate 24. The contact of the pin 42 with the terminal 43 closes a circuit which is traced through the wire 45, the magnet 41, the wire 46, the wire 17, the battery 18, the ground 20, and the wire 47, which connects with the plate upon which the parts are mounted. It is obvious that this last described circuit is closed, regardless of the direction in which the pointer 5 extends.

Having thus described the invention, what I claim is:—

1. An automobile signal having, in combination, a normally-upright pointer, pointer operating means comprising a shaft upon which the pointer is mounted, two separately-energizable magnet members located below the shaft and equally distant therefrom, and an armature mounted upon the shaft, said armature having a normally-upright middle portion and tapering end portions pointed toward the magnet members and being arranged so that when either of the magnet members is energized the middle portion of the armature is brought into engagement with the energized magnet member.

2. An automobile signal having in combination a normally upright pointer, pointer operating means comprising a shaft upon one end of which the pointer is mounted, two separately energizable magnet members equally distant from the shaft and an armature mounted upon the shaft, said armature consisting of a middle portion projecting radially from the shaft and which is adapted to come into engagement with the magnet members when they are energized, a tapering arm projecting from one side of the middle portion and extending toward one magnet member and a second tapering arm projecting from the other side of the middle portion and extending toward the other magnet member, the middle portion of the armature being thicker than the tapering arms.

3. An automobile signal having, in combination, a normally-upright pointer, pointer operating means comprising a shaft upon which the pointer is mounted, two separately-energizable magnet members located below the shaft and equally distant therefrom, and an armature mounted upon the shaft, said armature having a normally upright middle portion which is adapted to engage the magnet members, and two arms, one of which is pointed downwardly toward one magnet member and the other of which is pointed downwardly toward the other magnet member, both arms tapering from their ends toward the middle portion of the armature which is thicker than the arms.

4. An automobile signal having, in combination, a pointer, pointer operating means comprising a shaft upon which the pointer is mounted, two separately-energizable magnet members equally spaced from the shaft, and a crescent-shaped armature mounted on the shaft and having a projection from its middle portion, said armature having its tapered end portions pointed toward the magnet members and being arranged so that when one of the magnet members is energized the projection of the middle portion of the crescent-shaped armature is thereby brought into contact with the energized magnet member.

5. An automobile signal having, in combination, a pointer, pointer operating means comprising a shaft upon which the pointer is mounted, a crescent-shaped armature mounted on the shaft and having a prolonged middle portion and two separately-energizable magnet members consisting of flat bars equally distant from the shaft and spaced apart so that the arms of the armature may swing between them thereby permitting the middle portion of the armature to come into contact with the magnet members.

6. An automobile signal having, in combination, a pointer, pointer operating means comprising a shaft on one end of which the pointer is mounted, an armature mounted on the other end of the shaft, and two separately-energizable magnet members, said armature having a thickened middle portion and tapering end portions pointed toward the magnet members, the thickened middle portion being prolonged and adapted for engagement with the magnet members to determine the operative positions of the pointer.

7. An automobile signal having, in combination, a pointer, pointer operating means comprising a shaft on one end of which the pointer is mounted, an armature mounted on the other end of the shaft and two separately-energizable magnet members consisting of flat upright bars situated below and equally spaced from the shaft, said armature having a thickened middle portion and tapering end portions pointing toward the magnet members, the thickened middle portion being prolonged and adapted for engagement with the magnet members to determine the operative positions of the pointer.

8. In an automobile signal having a pointer, means for indicating whether the pointer is in operative position and a circuit in which the indicating means is located, pointer operating means comprising a shaft on one end of which the pointer is mounted, two separately energizable magnet members located at equal distances from the shaft, an armature mounted on the shaft and arranged to be actuated by the magnet members, a terminal for the circuit located substantially half way between the magnet members and means connected with the armature for engaging the terminal thereby closing the circuit when the pointer upon energization of either magnet member is swung into operative position.

CHARLES L. HYDE.